Figure 1:
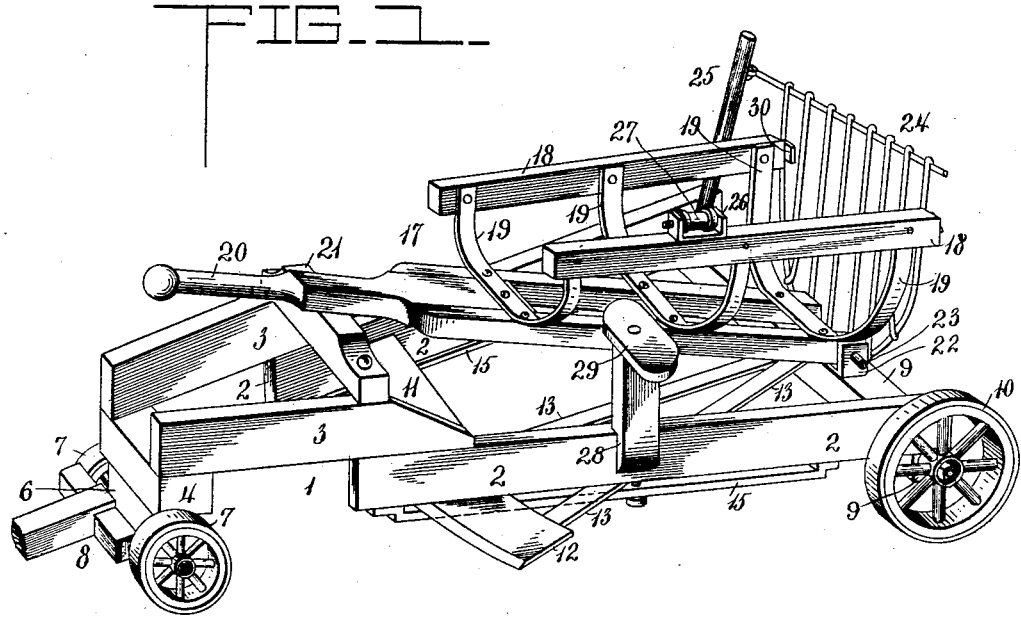

(No Model.) 2 Sheets—Sheet 1.

L. W. BELL.
CORN HARVESTER.

No. 591,805. Patented Oct. 19, 1897.

WITNESSES
W. E. Allen
Henry H. Byrne

INVENTOR
Lorenzo W. Bell
by John Wedderburn
Attorney (No Model.) 2 Sheets—Sheet 2.
L. W. BELL.
CORN HARVESTER.
No. 591,805. Patented Oct. 19, 1897.
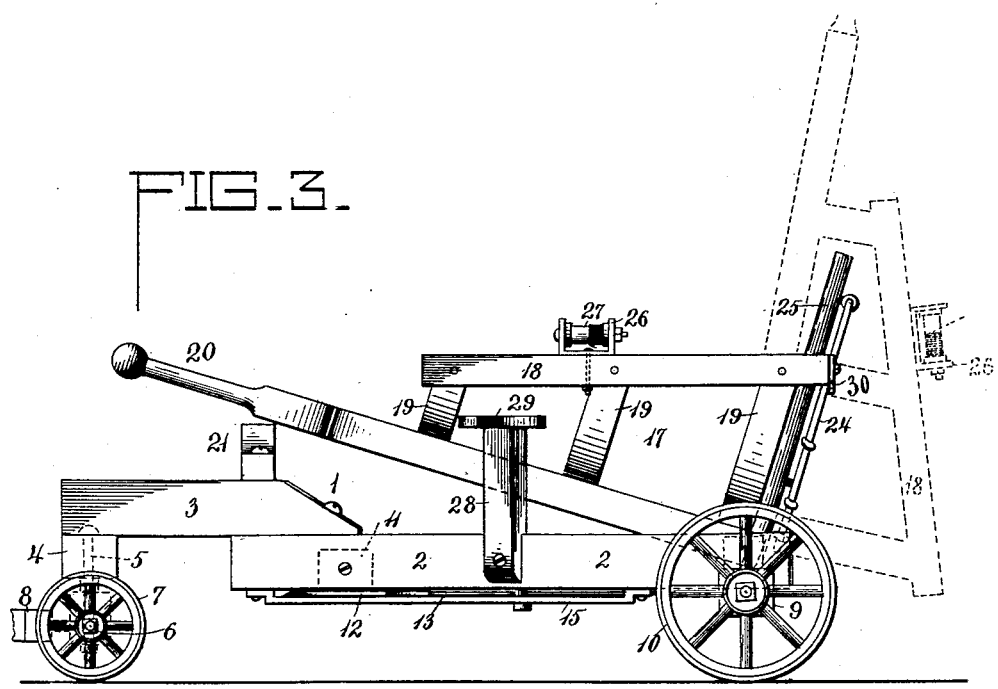
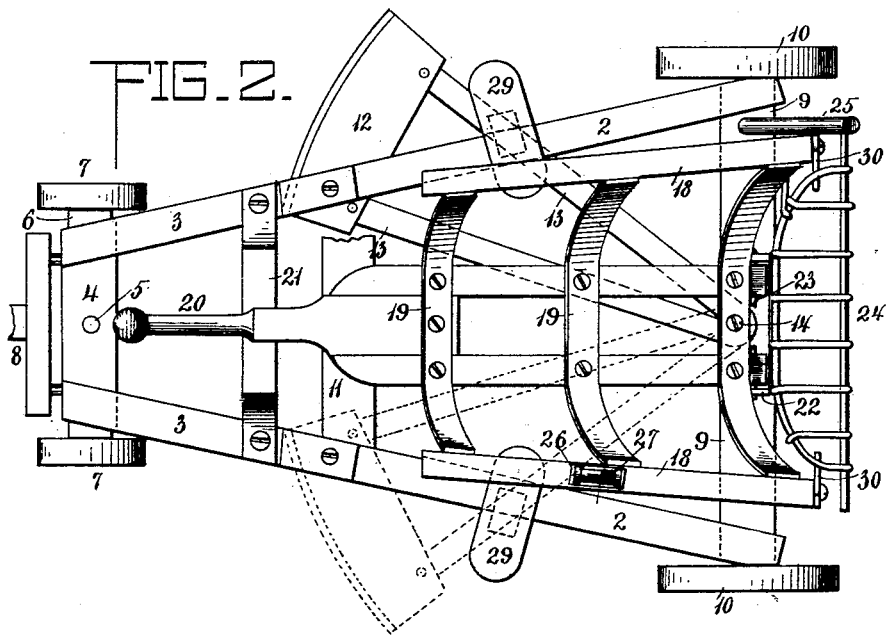
WITNESSES
W. E. Allen
Henry H. Byrne
INVENTOR
Lorenzo W. Bell
by John Wedderburn
Attorney

UNITED STATES PATENT OFFICE.

LORENZO W. BELL, OF SUMNER, MISSOURI.

CORN-HARVESTER.

SPECIFICATION forming part of Letters Patent No. 591,805, dated October 19, 1897.

Application filed December 10, 1896. Serial No. 615,127. (No model.)

*To all whom it may concern:*

Be it known that I, LORENZO W. BELL, a citizen of the United States, residing at Sumner, in the county of Charlton and State of Missouri, have invented certain new and useful Improvements in Corn-Harvesters; and I do hereby declare the following to be a full, clear, and exact description of the invention, such as will enable others skilled in the art to which it appertains to make and use the same.

This invention relates to corn-harvesters; and the object in view is to provide a simple and efficient machine carried upon wheels and embodying an adjustable and laterally-movable knife or cutter adapted to be projected alternately from opposite sides of the machine, so as to enable the operator to cut from the same side of the field.

The invention also contemplates a novel form of carrier in which the stalks of corn may be piled and from which they may be dumped in the form of a shock, the said carrier being provided with a spool or reel upon which the binding-wire or other material is placed and from which it may be unreeled and passed around the shock preparatory to dumping the same.

Other objects and advantages of the invention will appear in the course of the subjoined description.

The invention consists in an improved corn-harvester embodying certain novel features and details of construction and arrangement of parts, as hereinafter fully described, illustrated in the drawings, and pointed out in the claims.

Figure 4:
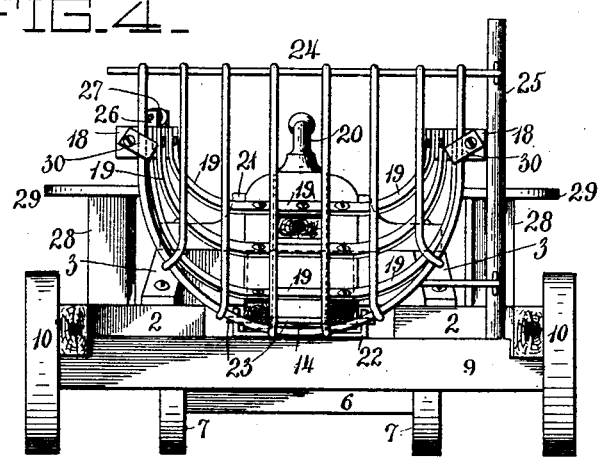

In the accompanying drawings, Figure 1 is a perspective view of a machine constructed in accordance with the present invention. Fig. 2 is a plan view thereof, showing the adjustable cutter, and indicating by dotted lines the position of the cutter when reversed. Fig. 3 is a side elevation of the machine, showing the carrier thrown back as when dumping a shock. Fig. 4 is a rear elevation of the machine.

Similar numerals designate corresponding parts in the several figures of the drawings.

Referring to the drawings, 1 designates a truck-frame which comprises spaced forwardly-converging side bars 2, the forward ends of which are preferably offset and elevated, as indicated at 3, and connected by means of a cross-bar 4, forming the bolster of the truck, the said bar or bolster receiving a king-pin 5, which passes downward into or through the front axle 6, upon which are mounted the forward carrying-wheels 7 and to which is pivotally connected the pole 8 for the attachment of the team. The side bars 2 are also connected at their rear ends by a cross-bar 9, which may also constitute a rear axle, having the rear carrying-wheels 10 mounted thereon. The side bars may be further braced by means of one or more cross-bars 11 intermediate their ends.

12 designates a movable and adjustable cutter which is preferably formed from a piece of sheet-steel and to which are rigidly connected a pair of rearwardly-converging arms 13, the said arms intersecting in line with the rear axle 9 and being pivotally connected thereto by means of a screw or bolt 14. The cutter thus constructed and mounted is adapted to be swung beneath the side bars 2 to one side or the other of the truck-frame, so as to project laterally from the truck-frame and form an oblique knife or blade which will operate with a shearing action upon the corn-stalks for severing the same. By reason of the adjustability of the cutter 12 either side of the machine may be presented to the corn, thus enabling the operator to cut from one side of the field only. The cutter 12 is supported by means of keepers 15 in the form of strips extending longitudinally beneath the side bars 2 and secured at their opposite ends thereto. The fasteners at the rear ends of said keepers are so located as to coöperate with the rearwardly-converging bars 13 of the cutter for limiting the outward movement of the cutter or the extent to which the same may project laterally from the machine.

17 designates a carrier for receiving the stalks and in which the shocks are made up. This carrier comprises a series of spaced and forwardly-converging bars 18, connected by a longitudinal series of curved or segmental cross-bars 19, thus forming a receptacle which is substantially semicircular in cross-section and which tapers longitudinally, being narrower at its forward end than at its rear end. A tongue 20 is mounted rigidly between the forward ends of two of the bars 18 and said tongue projects forward and finds its rest upon a cross-bar 21, connecting the side bars 2 of the machine-frame, said tongue forming a lifting-bar or lever by means of which the carrier may be dumped. The carrier 17 is pivotally mounted on the axle 9 by means of a bracket 22, formed from a piece of metal having its opposite ends upturned to receive a transverse horizontal pin or bolt 23, the same passing through the rear ends of the lower pair of longitudinal bars 18 of the carrier, as clearly shown in the rear elevation. At the back the carrier is provided with a gate 24, which is hinged to a post 25, extending upward from the rear axle and adapted to be engaged and held closed by a button 30 on the carrier for holding the stalks in place. Upon one side of the carrier is mounted a U-shaped bracket 26, in which is journaled a spool 27 and around which is wound wire or cord with which to bind the stalks into a shock. Upon each side of the machine-frame is a standard 28, secured rigidly to one of the side bars 2 and provided at its upper end with a seat 29, upon which the operator may sit for forming the shocks.

In operation the machine is driven along the field close to the corn and as the stalks are severed by the obliquely-disposed cutter 12 the operator lifts the stalks and deposits them in the carrier 17 with the butts of the stalks rearward. After the carrier has been filled, the wire or cord is drawn from the spool and passed around the same and tied so as to form the stalks into a shock. The machine is now driven to the proper part of the field, whereupon the operator lifts the tongue 20 and rocks the carrier on its fulcrum after having first moved the turn buttons or catches 30 to one side. The shock is thus deposited upon the ground and the carrier is thereafter returned to its normal or horizontal position, when it is in readiness to receive other stalks. The placing of the spool of binding material directly on the carrier will be found of great convenience, and will save the operator considerable time.

Having thus described the invention, what I claim as new is—

1. In a corn-harvester, the combination with the machine-frame, of an adjustable cutter adapted to be moved in a horizontal plane so as to alternately project from opposide sides of the frame, substantially as described.

2. In a corn-harvester, the combination with the machine-frame, of a movable cutter pivotally mounted on the machine-frame and adapted to be swung laterally to either side of the machine so as to project laterally therefrom and present an oblique cutting edge, substantially as described.

3. In a corn-harvester, the combination with the machine-frame comprising the spaced side bars, of a movable cutter consisting of a cutting-blade and an arm extending rearwardly therefrom and pivotally connected to the machine-frame at its rear end, and keepers extending beneath and secured to the side bars of the frame and forming supports for said cutter, the latter being adapted to be projected laterally from either side of the machine and to present an oblique cutting edge, substantially as described.

4. In a corn-harvester, the combination with a truck-frame mounted on carrying-wheels, of a carrier or receptacle fulcrumed at its rear end on the truck-frame, a tail gate hinged to an upright or post on the machine-frame, and a catch on the carrier for holding said gate shut, whereby the gate acts as a lock for preventing the accidental tilting of the carrier, substantially as described.

In testimony whereof I have signed this specification in the presence of two subscribing witnesses.

LORENZO W. BELL.

Witnesses:
JOHN S. EVANS,
CHAS. E. LEE.